(12) United States Patent
Horvitz

(10) Patent No.: US 7,464,093 B2
(45) Date of Patent: Dec. 9, 2008

(54) METHODS FOR ROUTING ITEMS FOR COMMUNICATIONS BASED ON A MEASURE OF CRITICALITY

(75) Inventor: Eric Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 11/183,686

(22) Filed: Jul. 18, 2005

(65) Prior Publication Data

US 2005/0251560 A1  Nov. 10, 2005

Related U.S. Application Data

(60) Division of application No. 10/795,713, filed on Mar. 8, 2004, now Pat. No. 7,233,954, which is a continuation of application No. 10/620,116, filed on Jul. 15, 2003, now Pat. No. 7,337,181, which is a division of application No. 09/364,528, filed on Jul. 30, 1999, now Pat. No. 6,622,160.

(51) Int. Cl.
*G06F 17/30* (2006.01)

(52) U.S. Cl. ............... 707/10; 707/6; 707/9; 707/104.1; 709/240

(58) Field of Classification Search ............... 707/1–10, 707/100–104.1, 200–206; 709/238–244
See application file for complete search history.

(56) References Cited

U.S. PATENT DOCUMENTS

| | | | |
|---|---|---|---|
| 5,077,668 A | 12/1991 | Miwako Doi | |
| 5,377,354 A | 12/1994 | Scannell et al. | |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,634,084 A | 5/1997 | Malsheen et al. | |
| 5,694,616 A | 12/1997 | Johnson et al. | |
| 5,812,865 A | 9/1998 | Theimer et al. | |
| 5,864,848 A | 1/1999 | Horvitz | |
| 5,907,839 A | 5/1999 | Roth | |
| 5,950,187 A | 9/1999 | Tsuda | |
| 5,974,465 A | 10/1999 | Wong | |
| 5,978,837 A | 11/1999 | Foladare et al. | |
| 5,995,597 A | 11/1999 | Woltz et al. | |
| 6,021,403 A | 2/2000 | Horvitz | |
| 6,067,565 A | 5/2000 | Horvitz | |
| 6,101,531 A | 8/2000 | Eggleston et al. | |

(Continued)

OTHER PUBLICATIONS

U.S. Appl. No. 09/007,894, filed Jan. 15, 1998, Horvitz.
U.S. Appl. No. 09/055,477, filed Apr. 6, 1998, Platt.
J. Breese, et al., Empirical Analysis of Predictive Algorithms Algorithms for Collaborative Filtering, in Proceedings of the 14th Conference on Uncertainty in Artificial Intelligence, 1998, pp. 43-52, AUAI, Morgan Kaufmann, San Francisco.

(Continued)

*Primary Examiner*—Isaac M Woo
(74) *Attorney, Agent, or Firm*—Amin, Turocy & Calvin, LLP

(57) ABSTRACT

The routing of prioritized documents such as email messages is disclosed. In one embodiment, a computer-implemented method first receives a text. The method assigns a priority to the document, based on a text classifier such as a Bayesian classifier or a support-vector machine classifier. The method then routes the text based on a routing criteria. In one embodiment the routing is directed by a measure of priority that reflects the expected cost of delayed review of the document.

20 Claims, 16 Drawing Sheets

U.S. PATENT DOCUMENTS

| | | | |
|---|---|---|---|
| 6,144,942 | A | 11/2000 | Ruckdashel |
| 6,147,977 | A | 11/2000 | Thro et al. |
| 6,161,130 | A | 12/2000 | Horvitz et al. |
| 6,182,059 | B1 * | 1/2001 | Angotti et al. ............... 706/45 |
| 6,185,603 | B1 | 2/2001 | Henderson et al. |
| 6,189,027 | B1 | 2/2001 | Haneda et al. |
| 6,192,360 | B1 | 2/2001 | Dumais et al. |
| 6,195,533 | B1 | 2/2001 | Tkatch et al. |
| 6,212,265 | B1 | 4/2001 | Duphorne |
| 6,216,165 | B1 | 4/2001 | Woltz et al. |
| 6,233,430 | B1 | 5/2001 | Helferich |
| 6,282,565 | B1 | 8/2001 | Shaw et al. |
| 6,317,592 | B1 | 11/2001 | Campana, Jr. et al. |
| 6,327,581 | B1 | 12/2001 | Platt |
| 6,370,526 | B1 | 4/2002 | Agrawal et al. |
| 6,396,513 | B1 | 5/2002 | Helfman et al. |
| 6,408,277 | B1 | 6/2002 | Nelken |
| 6,411,930 | B1 | 6/2002 | Burges |
| 6,411,947 | B1 | 6/2002 | Rice et al. |
| 6,421,708 | B2 | 7/2002 | Bettis |
| 6,421,709 | B1 | 7/2002 | McCormick et al. |
| 6,424,995 | B1 | 7/2002 | Shuman |
| 6,442,589 | B1 * | 8/2002 | Takahashi et al. ........... 709/203 |
| 6,466,232 | B1 | 10/2002 | Newell et al. |
| 6,484,197 | B1 | 11/2002 | Donohue |
| 6,490,574 | B1 | 12/2002 | Bennett et al. |
| 6,513,026 | B1 | 1/2003 | Horvitz et al. |
| 6,513,046 | B1 | 1/2003 | Abbott, III et al. |
| 6,549,915 | B2 | 4/2003 | Abbott, III et al. |
| 6,553,358 | B1 | 4/2003 | Horvitz |
| 6,557,036 | B1 | 4/2003 | Kavacheri et al. |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0002450 | A1 | 1/2002 | Nunberg et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2005/0034078 | A1 | 2/2005 | Abbott et al. |

OTHER PUBLICATIONS

M. Czerwinski, et al., Visualizing Implicit Queries for Information Management and Retrieval, in Proceedings of CHI'99, ACM SIGCHI Conference on Human Factors in Computing Systems, 1999, pp. 560-567, Ass'n for Computing Machinery, Pittsburgh, PA.

S. Dumais, et al., Inductive Learning Algorithms and Representations for Text Categorization, in Proceedings of the 7th Internat'l. Conference on Information and Knowledge Mgmt., 1998, pp. 148-155, Ass'n. for Computing Machinery, ACM Press, NY.

E. Horvitz, Principles of Mixed-Initiative User Interfaces, in Proceedings of CHI'99, ACM SIGCH Conference on Human Factors in Computing Systems, 1999, pp. 159-166, Ass'n. for Computing Machinery, Pittsburgh, PA.

E. Horvitz, et al., Display of Information for Time-Critical Decision Making, in Proceedings of the 11th Conference on Uncertainty in Artificial Intelligence, 1995, pp. 296-305, Montreal, Canada, Morgan Kaufmann, San Francisco.

E. Horvitz, et al., The Lumiere Project: Bayesian Use Modeling for Inferring the Goals and Needs of Software Users, in Proceedings of the 14th Conference on Uncertaintly in Artificial Intelligence, 1998, pp. 256-265, Morgan Kaufmann, San Francisco.

E. Horvitz, et al., Time-Dependent Utility and Action Under Uncertatinty, in Proceedings of the 7th Conference on Uncertatinty in Artificial Intelligence, 1991, pp. 151-158, Morgan Kaufmann, San Francisco.

E. Horvitz, et al., Time-Critical Action: Representations and Application, in Proceedings of the 13th Conference on Uncertainty in Artificial Intelliegence (UAI'97), 1997, pp. 250-257, Providence, RI, Morgan Kaufmann, San Francisco.

D. Koller, et al., Toward Optimal Feature Selection, in Proceedings of the 13th Conference on Machine Learning, 1996, pp. 284-292, Morgan Kaufmann, San Francisco.

H. Lieberman, An Agent That Assist Web Browsing, in Proceedings of IJCAI-95, 1995, Montreal, Canada, Morgan Kaufmann, San Francisco.

J. Platt, Fast Training of Support Vector Machines Using Sequential Minimal Optimization, in Advances in Kernal methods: Support Vector Learning, 1999, MIT Press, Cambridge, MA.

J. Platt, Probabilistic Outputs for Support Vector Machines and Comparison to Regularized Likelihood Methods, in Advances in Large Margin Classifiers, 1999, MIT Press, Cambridge, MA.

M. Sahami, et al., A Bayesian Approach to Filtering Junk E-Mail, in Workshop on Learning for Text Categorization, AAAI Technical Report WS-98-05, 1998, American Association for Artificial Intelligence, AAAI.

International Search Report dated Sep. 22, 2003 mailed Sep. 29, 2003 for PCT Application Ser. No. PCT/US00/20685, 4 pages.

Robert M. Losee, Jr., Minimizing Information Overload: The Ranking of Electronic Messages, Journal of Information Science, 1989, pp. 179-189, vol. 15, Issue 3.

Thorsten Joachims, Text Categorization with Support Vector Machines: Learning with Many Relevant Features, 1998, 14 pages.

Kenrick Mock, An Expereimental Framework for Email Categorization and Management, Proceedings of the 24th Annual ACM SIGIR Conference, Sep. 9-12, 2001, pp. 392-393, New Orleans, Louisiana, USA.

Gary Boone, Concept Features in Re:Agent, an Intelligent Email Agent, Proceedings of the 2nd International Conference on Autonomous Agents, 1998, pp. 141-148, Minneapolis, MN, USA.

Elisabeth Crawford et al., An Intelligent Interface for Sorting Electronic Mail, Proceedings of the 7th International Conference on Intelligent User Interfaces, Jan. 13-16, 2002, pp. 182-183, San Francisco, California, USA.

David Heckerman, A Tutorial on Learning With Bayesian Networks, Microsoft Research, Nov. 1996, 57 pages.

William W. Cohen, Learning the Rules that Classify E-Mail, AAAI Spring Symposium on ML and IR, 1996, accessed at http://www.cs.cmu.edu/~wcohen/postscript/aaai-ss-96.ps, 8 pages.

David D. Lewis, Evaluating and Optimizing Autonomous Text Classification Systems, International ACM-SIGIR Conference on Research and Development in Information Retrieval, 1995, pp. 246-254.

David D. Lewis et al., Training Algorithms for Linear Text Classifiers, SIGIR'96, 1996, 9 pages.

Chidanand Apte et al., Automated Learning of Decision Rules for Text Categorization, ACM Transactions on Information Systems (TOIS), 1994, pp. 233-251, vol. 12, Issue 13.

Stewart Forscher, CyberNag (Mailmen Division) Project Notebook, Feb. 21, 1996, accessed at http://www.cc.gatech.edu/computing/classes/cs3302__96__winter/projects/groups/MailMen/, last accessed on Feb. 9, 2004, 14 pages.

Andy Harter et al., A Distributed Location System for the Active Office, pp. 62-70, IEEE Network, Jan./Feb.1994.

Guanling Chen et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer et al., Providing Location Information in a Ubiquitous Computing Environment, SIGOPS '93, 1993, pp. 270-283, N.C., USA.

Marvin Theimer et al., Operating System Issues for PDAs, In Fourth Workshop on Workstation Operating Systems, 1993, 7 pages.

Roy Want, Active Badges and Personal Interactive Computing Opbjects, IEEE Transactions on Consumer Electronics, Feb. 1992, 11 pages, vol. 38, No. 1.

Bill N. Schilit et al., The ParcTab Mobile Computing System, IEEE WWOS-IV, 1993, 4 pages.

Bill Schilit et al., Context-Aware Computing Applications, In Proceedings of the Workshop on Mobile Computing Systems and Applications, Dec. 1994, pp. 85-90.

Bill N. Schilit et al., Customizing Mobile Applications, Proceedings USENIX Symposium on Mobile and Location Independent Computing, Aug. 1993, 9 pages.

Mike Spreitzer et al., Architectural Considerations for Scalable, Secure, Mobile Computing with Location Information, In The 14th International Conference on Distributed Computing Systems, IEEE, Jun. 1994, pp. 29-38.

Mike Spreitzer et al., Scalable, Secure, Mobile Computing with Location Information, Communications of the ACM, Jul. 1993, 1 page, vol. 36, No. 7.

Roy Want et al., The Active Badge Location System, ACM Transactions on Information Systems, Jan. 1992, pp. 91-102, vol. 10, No. 1.

Mark Weiser, Some Computer Science Issues in Ubiquitous Computing, Communications of the ACM, Jul. 1993, pp. 75-84, vol. 36, No. 7.

Mark Billinghurst et al., An Rvaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Memory, The Proceedings of the First International Symposium on Wearable Computers, Oct. 1997, pp.123-128., Cambridge, Mass, USA.

Eric Horvitz et al., Attention-Sensitive Alerting in Computing Systems, Microsoft Research, Aug. 1999, 26 pages.

Bill N. Schilt et al., Dissemintating Active Map Information to Mobile Hosts, IEEE Network, 1994, pp. 22-32, vol. 8, No. 5.

Mark Billinghurst et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, pp. 218-224.

Workshop on Wearable Computing Systems, Aug. 19-21, 1996, accessed at http://wearcam.org/computing/workshop/schedule.html, as accessed at Apr. 4, 2005, 3 pages.

Mark Billinghurst, Research Directions in Wearable Computing, University of Washington, May 1998, as accessed at http://www.hitl.washington.edu/consortium/mark598/sld001.htm, as accessed at Apr. 4, 2005, 48 pages.

Mark Weiser, The Computer for the 21st Century, Scientific American, Sep. 1991, pp. 94-104, vol. 265, No. 3.

* cited by examiner

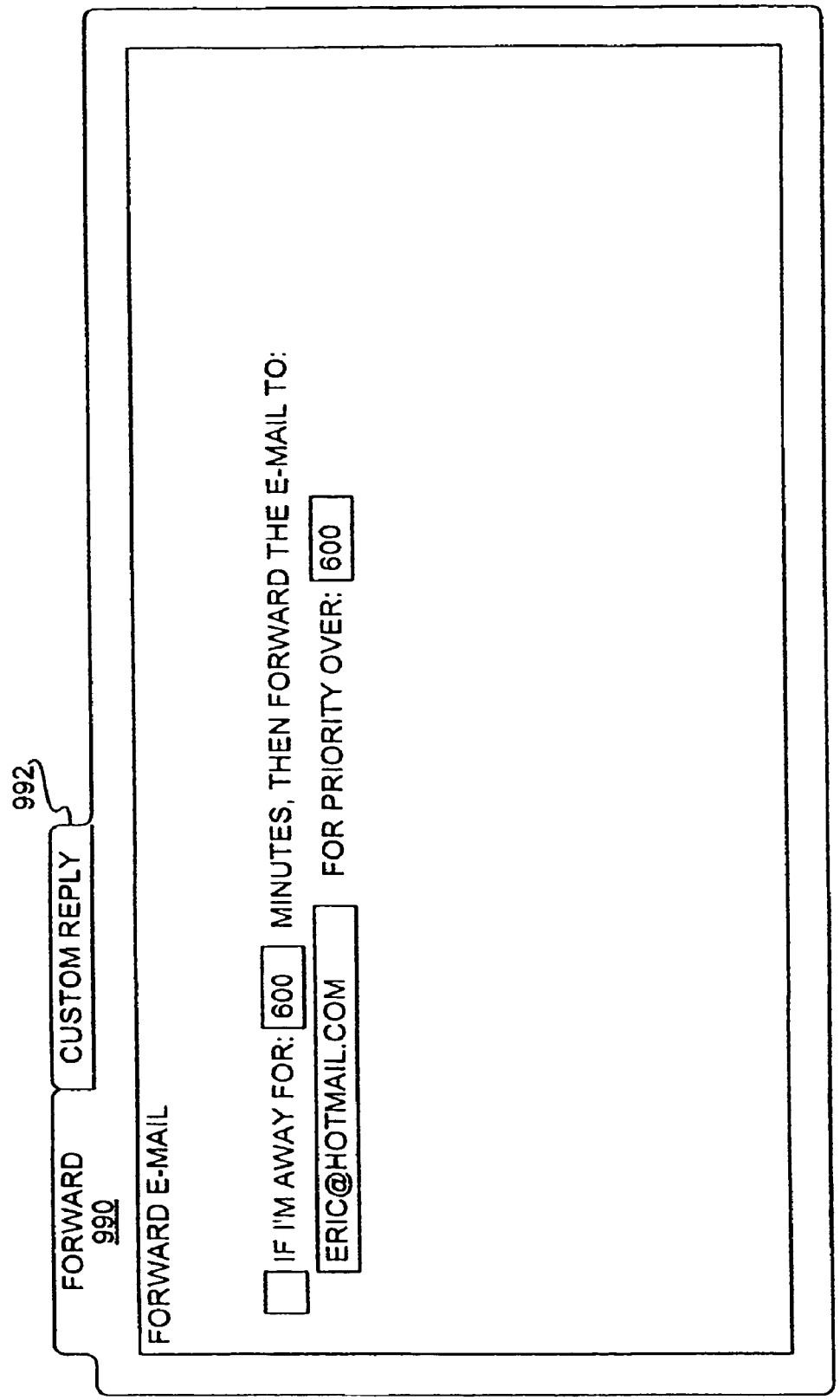

FIG 14(b)

FORWARD | CUSTOM REPLY 992

REPLY TO E-MAIL

☐ IF I'M AWAY FOR: [120] MINUTES AND PRIORITY IS OVER: [95] THEN REPLY TO SENDER WITH THIS TEXT:

ERIC HAS BEEN OUT OF OFFICE IN MEETINGS QUITE A BIT TODAY. IF THIS IS TIME CRITICAL, YOU CAN REACH HIM BY CELL PHONE AT 425-555-5555.

990

METHODS FOR ROUTING ITEMS FOR COMMUNICATIONS BASED ON A MEASURE OF CRITICALITY

RELATED APPLICATIONS

This application is a divisional of U.S. patent application Ser. No. 10/795,713, filed on Mar. 8, 2004, entitled "Methods for Routing Items for Communications Based on a Measure of Criticality," which is a continuation of U.S. patent application Ser. No. 10/620,116, filed on Jul. 15, 2003, entitled "Methods for Routing Item for Communications Based on a Measurement of Criticality", which is a divisional application of U.S. patent application Ser. No. 09/364,528, filed on Jul. 30, 1999 entitled "Methods for Routing Documents Based on a Measure of Criticality." This application is related to the copending applications entitled "Methods for Automatically Assigning Priorities to Documents and Messages" filed on Jul. 30, 1999 and assigned Ser. No. 09/364,527, "Integration of a Computer-Based Message Priority System with Mobile Electronic Devices" filed on Jul. 30, 1999 and assigned Ser. No. 09/365,293, "Methods for Display, Notification, and Interaction with Prioritized Messages" filed on Jul. 30, 1999 and assigned Ser. No. 09/364,522, and "A Computational Architecture for Managing the Transmittal and Rendering of Information, Alerts, and Notifications" filed on Jul. 30, 1999 and assigned Ser. No. 09/365,287. The above-noted applications are incorporated herein by reference.

FIELD OF THE INVENTION

This invention relates generally to prioritized text such as prioritized email messages, and more particularly to the routing of such prioritized text.

BACKGROUND OF THE INVENTION

Electronic mail programs have become a popular application among computer users. Especially with the advent of the Internet, exchanging email has almost become a reason why people purchase computers for personal reasons, and within many corporate environments, email has become the standard manner by which coworkers exchange information. However, with the increasing popularity of email, shortcomings have become apparent.

Chief among these shortcomings is that many users now face a deluge of email every day, such that the capability of being able to send and receive email has almost become a hindrance to their day-to-day ability to get their job done, as opposed to being an asset. Some users report receiving over 100 email messages a day. With such large numbers of email, it is difficult to manage the email, such that the users read the most important messages first.

Limited solutions to this problem have been attempted in the prior art. Prior art exists for attempting to curtail the amount of junk email—e.g., unsolicited email, typically regarding a service or product for sale—that users receive. Moreover, some electronic mail programs allow for the generation of rules that govern how an email is managed within the program—for example, placing all emails from certain coworkers in a special folder.

These limited solutions, however, do not strike at the basic problem behind email—that with so much email being received, it would be most useful for a user to be able to have his or her computer automatically prioritize the email by importance or review urgency, and perform actions based on that prioritization. For these and other reasons, there is a need for the present invention.

SUMMARY OF THE INVENTION

The invention relates to the routing of prioritized text such as email messages. In one embodiment, a computer-implemented method first receives a text. The method generates a priority of the text, based on a text classifier such as a Bayesian classifier or a support-vector machine classifier. The method then routes the text based on a routing criteria.

Embodiments of the invention provide for advantages over the prior art. A user, for example, in one embodiment, may ask that he or she only be disturbed if the priority of the text is greater than a given threshold. Thus, even if the user receives over 100 different emails, he or she will be alerted to the most important email, and then will be able to deal with the other email when the user has time. Prioritization, in other words, makes email much more useful in environments where a lot of email is exchanged on a regular basis.

Embodiments of the invention include computer-implemented methods, computer-readable media, and computerized systems of varying embodiments. Still other embodiments, advantages and aspects of the invention will become apparent by reading the following detailed description, and by reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices. (It is noted that the terms document and text are used interchangeably herein and should be construed as interchangeable as well.)

Operating Environment

Figure 1:
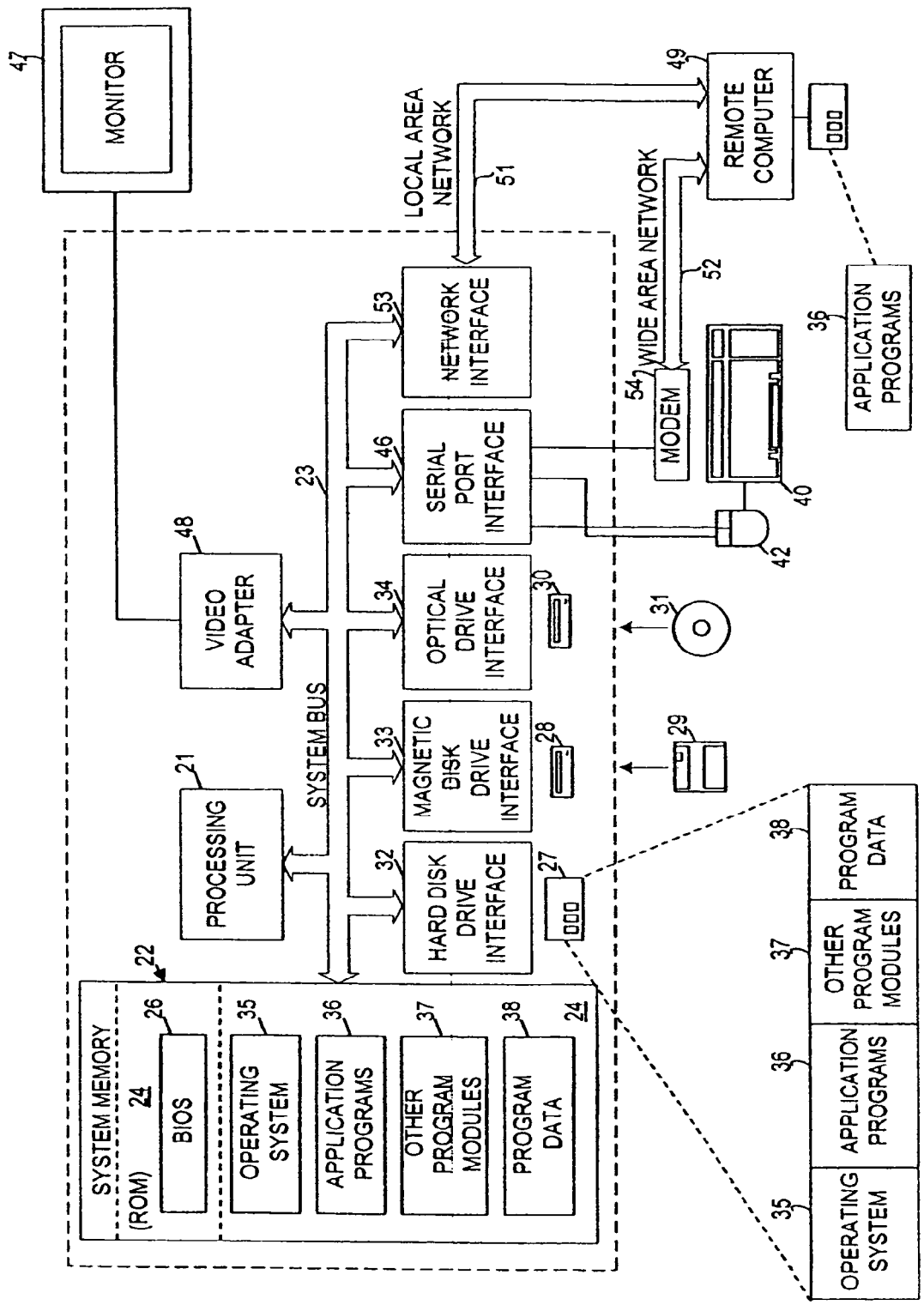
FIG. 1 is a diagram of an operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Generating a Priority for a Text

In this section of the detailed description, the generation of a priority for a text such as an email, according to one embodiment of the invention, is described. The generation of priorities for texts as described can then be used in methods, systems, and computer-readable media (as well as other embodiments) of the invention as are presented in other sections of the detailed description. The description in this section is provided in conjunction with FIG. 2 and FIG. 3, the former which is a diagram showing explicit and implicit training of a text classifier, according to an embodiment of the invention, and the latter which is a diagram showing how a priority for a text is generated by input to a text classifier, according to an embodiment of the invention. The description is also provided in conjunction with FIGS. 4(a) and 4(b), which are diagrams of different schema according to which the priority of a text can be classified, and in conjunction with FIGS. 5(a) and 5(b), which are graphs showing different cost functions that may be applicable depending on text type.

Figure 2:
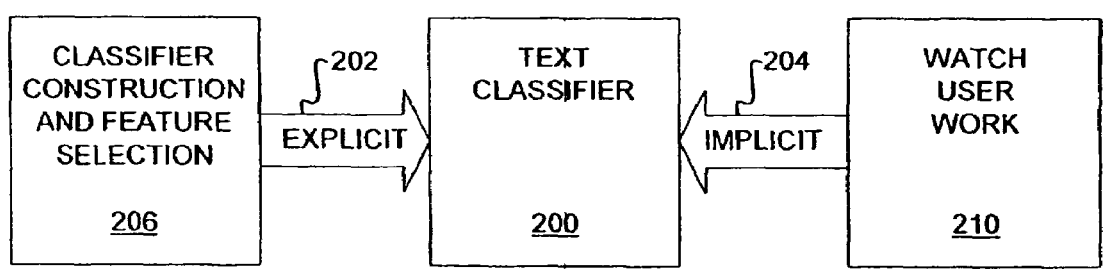
FIG. 2 is a diagram showing explicit and implicit training of a text classifier, according to an embodiment of the invention.

Referring first to FIG. 2, the text classifier 200 is able to be trained both explicitly, as represented by the arrow 202, and implicitly, as represent by the arrow 204. The explicit training represented by the arrow 202 is usually conducted at the initial phases of constructing the text classifier 200, while the implicit training represented by the arrow 204 is usually conducted after the text classifier 200 has been constructed, to fine tune the classifier 200. However, the invention is not so limited.

The text classifier 200 in one embodiment is a Bayesian classifier, as known within the art, while in another embodiment it is a support vector machine (SVM) classifier, as also known within the art. Text classification methodology based on a Bayesian learning approach is specifically described in the reference M. Sahami, S. Dumais, D. Heckerman, E. Horvitz, A Bayesian Approach to Junk E-Mail Filtering, AAAI Workshop on Text Classification, July 1998, Madison, Wis., AAAI Technical Report WS-98-05, which is hereby incorporated by reference. Text classification methodology based on an SVM approach is specifically described in the following references: the coassigned patent, U.S. Pat. No. 5,864,848, issued Jan. 26, 1999, which is hereby incorporated by reference; the previously filed and coassigned case entitled "Methods and Apparatus for Building a Support Vector Machine Classifier," Ser. No. 09/055,477, filed on Apr. 6, 1998, which is also hereby incorporated by reference; and, the reference J. Platt, Fast Training of Support Vector Machines using Sequential Minimal Optimization, MIT Press, Baltimore, Md., 1998, which is also hereby incorporated by reference. For purposes of this application, specific description is made with reference to an SVM classifier, although those of ordinary skill within the art can appreciate that the invention is not so limited.

As shown in FIG. 2, the explicit training of the text classifier 200 as represented by the arrow 202 includes constructing the classifier in 206, including utilizing feature selection. In general, Support Vector Machines build classifiers by identifying a hyperplane that separates a set of positive and negative examples with a maximum margin. In the linear form of SVM that is employed in one embodiment, the margin is defined by the distance of the hyperplane to the nearest positive and negative cases for each class. Maximizing the margin can be expressed as an optimization problem. A post-processing procedure described in the Platt reference is used that employs regularized maximum likelihood fitting to produce estimations of posterior probabilities. The method fits a sigmoid to the score that is output by the SVM classifier.

In the explicit training, the text classifier is presented with both time-critical and non-time-critical texts (e.g., email messages), so that it may be able to discriminate between the two. This training set may be provided by the user, or a standard training set may be used. Given a training corpus, the text classifier first applies feature-selection procedures that attempt to find the most discriminatory features. This process employs a mutual-information analysis. Feature selection can operate on single words or higher level distinctions made available, such as phrases and parts of speech tagged with natural language processing—that is, the text classifier 200 is able to be seeded with specially tagged text to discriminate features of a text that are considered important.

Feature selection for text classification typically performs a search over single words. Beyond the reliance on single words, domain-specific phrases and high-level patterns of features are also made available. Special tokens can also enhance classification. The quality of the learned classifiers for email criticality can be enhanced by inputting to the feature selection procedures handcrafted features that are identified as being useful for distinguishing among email of different time criticality. Thus, during feature selection, single words as well as special phrases and symbols that are useful for discriminating among messages of different levels of time criticality are considered.

Tokens and patterns of value in identifying the criticality of messages include such distinctions as (including Boolean combinations thereof):

To: field
Addressed just to user
Addressed to only a few people including user
Addressed to an alias with a small number of people
Addressed to several aliases with a small number of people
Cc:'d to user
Bcc:'d to user People
Names on pre-determined list of important people
Family members
People at company Organization chart structure
    Managers I report to
    Managers of managers of people I report to
    People who report to me
External business people Past tense
These include descriptions about events that have already occurred such as:
We met
meeting went
happened
got together
took care of
meeting yesterday Future tense
Tomorrow
This week
Are you going to
When can we Meeting and coordination
Get together
Can you meet
Will get together
Coordinate with
Need to get together Resolved dates
Dates indicated from text and msg. time (e.g., tomorrow, send yesterday)

Questions
Word+?

Indications of personal requests:
Can you
Are you
Will you
you please
Can you do Indications of need:
I need
He needs
She needs
I'd like
It would be great
I want
He wants
She wants
Take care of Time Criticality
happening soon
right away
deadline will be
deadline is
as soon as possible
needs this soon
to be done soon
done right away Importance
is important
is critical
Word+!
Explicit priority flag status (low, none, high)

Length of Message
Number of bytes in component of new message

Signs of Commercial and Adult-Content Junk email
Free!!
!!!
Under 18
Adult
Percent caps
Percent nonalphanumeric characters
etc.

Other features that may be used for feature selection are described in the cofiled, copending and coassigned application entitled "A Computational Architecture for Managing the Transmittal and Rendering of Information, Alerts, and Notifications" filed on Jul. 30, 1999 and assigned Ser. No. 09/365,287, which is hereby incorporated by reference, and in the copending and coassigned application entitled "Methods and Apparatus for Building a Support Vector Machine Classifier," Ser. No. 09/055,477, filed on Apr. 6, 1998, which has already been incorporated by reference.

Furthermore, still referring to FIG. 2, implicit training of the text classifier 200, as represented by the arrow 204, can be conducted by continually watching the user work in 210. The assumption is that as users work, and lists of mail are reviewed, time-critical messages are read first, and low-priority messages are reviewed later, or just deleted. That is, when presented with a new email, the user is watched to determine whether she immediately opens the email, and in what order (if more than one new email are present), deletes the email without opening, and/or replies to the email right away. Thus, the text classifier is such that a user is continually watched while working, and the classifier is continually refined by training in the background and being updated in real time for decision making. For each message inputted into the classifier, a new case for the classifier is created. The cases are stored as negative and positive examples of texts that are either high or low priority.

Figure 3:
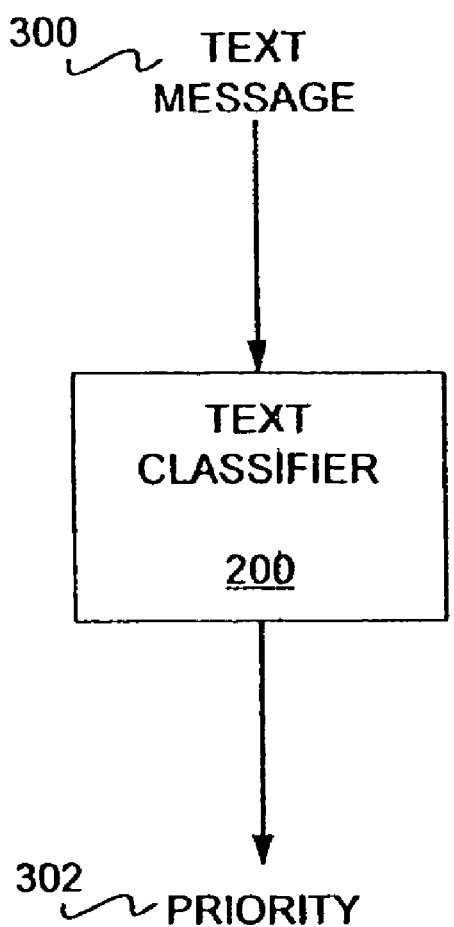
FIG. 3 is a diagram showing how a priority for a text is generated by input to a text classifier, according to an embodiment of the invention.
Figure 4A:
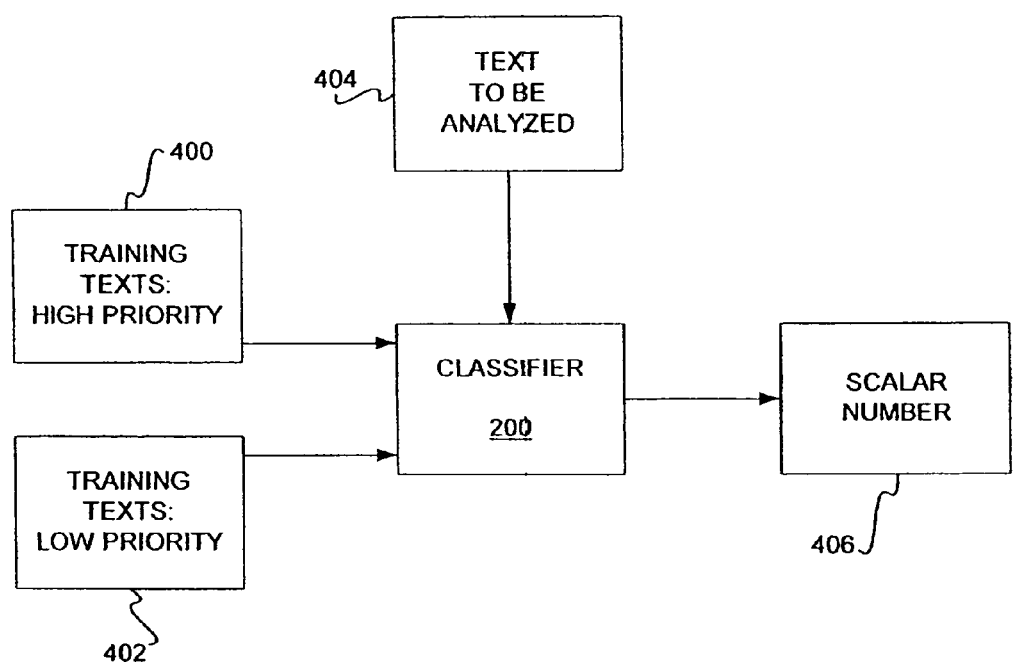
FIG. 4(a) is a diagram of a scheme according to which the priority of a text can be classified, according to an embodiment of the invention.

Referring next to FIG. 3, a text, such as an email message, 300 is input into the text classifier 200, which based thereon generates a priority 302 for the text 300. That is, in one embodiment, the text classifier 200 generates a priority 302, measured as a percentage from 0 to 1 (i.e., 0% to 100%). This percentage is a measure of the likelihood that the text 300 is of high priority, based on the previous training of the classifier 200. The priority in one embodiment is a measure of the rate of cost accrued with delayed review of the document.

In addition, the priority can be based on the case where the user has not yet
    reviewed a document already. In such an instance, as described in more detail in the
    related cases already incorporated by reference, this can be based on $$NEVA = EVTA - ECA - TC$$

where NEVA is the net expected value of alerting, EVTA is the expected value of alerting, ECA is the expected cost of alerting, and TC is the transmission cost. Thus, alerting can be made when the NEVA exceeds a predetermined threshold. For example, if size of message is important, then a bin-packing approximation, as known within the art, can be employed, to attempt to prioritize transfers by NEVA divided by the message size in bytes to guide the transmission ordering. Alternatively, a threshold on the fraction, above which transfers are made and below which transfers are suppressed, can also be utilized.

It is noted that as has been described, the text classifier and the priority generated thereby is based on a scheme where each email in the training phase is construed as either high priority or low priority, such that the priority generated by the text classifier is a measure of the likelihood of the text being analyzed is of high priority. This scheme is specifically shown by reference to FIG. 4(a), where the text classifier 200 is trained by a group of texts 400 that are high priority and a group of texts 402 that are low priority, such that a text to be analyzed 400 is input into the classifier 200, which outputs a scalar number 406 measuring the likelihood that the text being analyzed is of high priority. However, those of ordinary skill within the art can appreciate that the invention is not so limited.

Figure 4B:
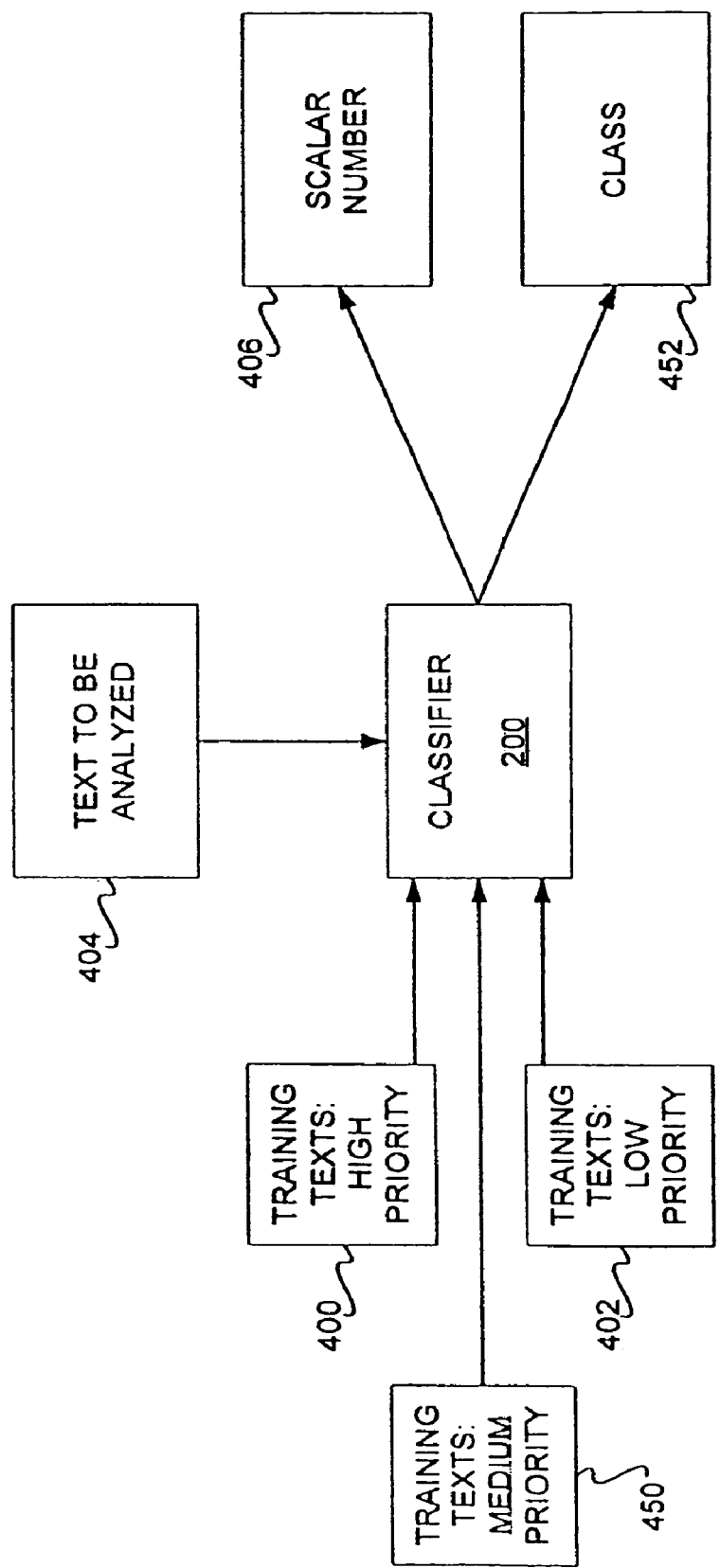
FIG. 4(b) is a diagram of another scheme according to which the priority of a text can be classified, according to another embodiment of the invention.

For example, referring to FIG. 4(b), a diagram showing a scheme where texts are divided into low, medium and high priority, according to an embodiment of the invention, is shown. The text classifier 200 in the embodiment of FIG. 4(b) is trained by a group of texts 400 that are high priority and a group of texts 402 that are low priority, as in the previous embodiment, but also by a group of texts 450 that are medium priority. Thus, a text to be analyzed 400 is input into the classifier 200, which outputs a scalar number 406, that can measure the likelihood that the text being analyzed is of high priority, if so desired, or medium priority or low priority. The classifier 200 is also able to output a class 452, which indicates the class of low, medium or high priority that the text 404 most likely falls into. Those of ordinary skill within the art can appreciate that further classes can also be added if desired.

The invention is not limited to the definition of priority as this term is used by the text classifier to assign such priority to a text such as an email message. In one embodiment, however, priority is defined in terms of a loss function. More specifically, priority is defined in terms of the expected cost in lost opportunities per time delayed in reviewing the text after it has been received—that is, the expected lost or cost that will result for delayed processing of the text. This loss function can further vary according to the type of text received.

Figure 5A:
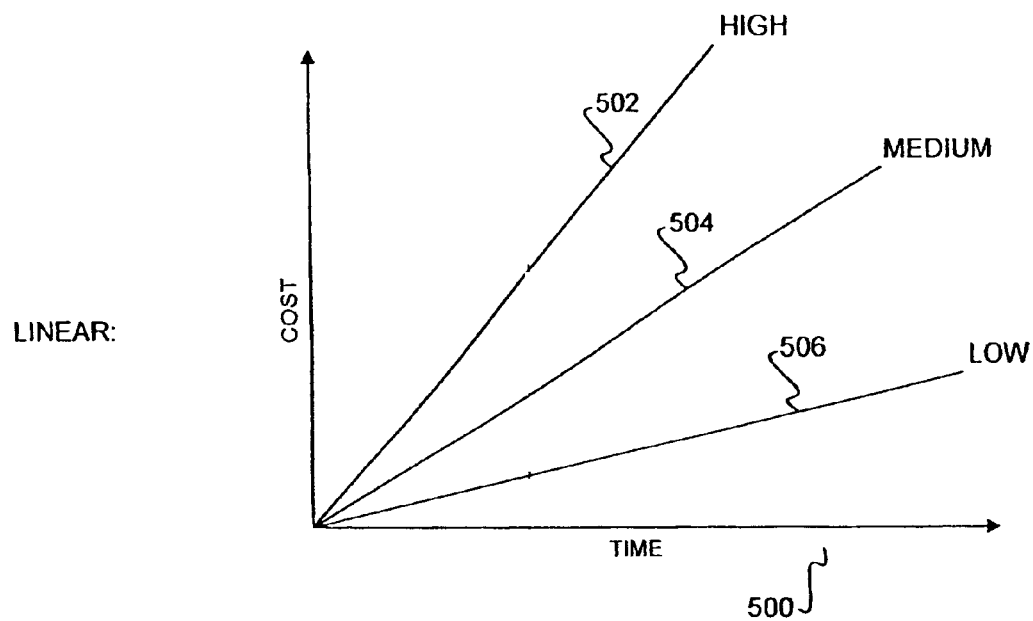
FIG. 5(a) is a graph showing linear cost functions of high, medium and low priority texts, according to an embodiment of the invention.

For example, the general case is shown in FIG. 5(a), which is a graph of linear cost functions dependent on the priority of a text. In the graph 500, as time increases, the cost of not having reviewed a text also increases. However, the cost increases more for a high priority message, as indicated by the line 502, as compared to a medium priority message, as indicated by the line 504, or a low priority message, as indicated by the line 506. That is, the high priority line 502 may have a slope of 100, the medium priority line 504 may have a slope of 10, and the low priority line 502 may have a slope of 1. These slope values can then be used by the text classifier to assist in assigning a priority to a given text, for example, by regression analysis.

Figure 5B:
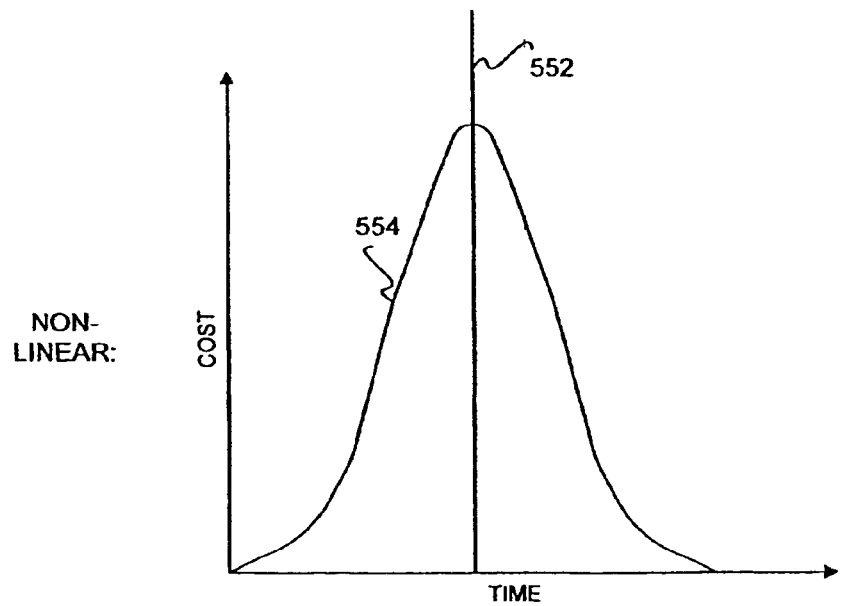
FIG. 5(b) is a graph showing a non-linear cost function for a text, according to an embodiment of the invention.

Some messages, however, do not have their priorities well approximated by the use of a linear cost function. For example, a message relating to a meeting will have its cost function increase as the time of the meeting nears, and thereafter, the cost function rapidly decreases—since after the meeting is missed, there is not much generally a user can do about it. This situation is better approximated by a non-linear cost function, as shown in FIG. 5(b). In the graph 550, the cost function 554 rapidly increases until it reaches the time of the meeting demarcated by the line 552, after which it rapidly decreases. Thus, those of ordinary skill within the art can appreciate that depending on a message's type, the cost function can be approximated by one of many different representative cost functions, both linear and non-linear.

Thus, as has been described, the priority of a text can be just the likelihood that it is of high priority based on output of a text classifier, or the most likely priority class (i.e., medium, low or high priority) it falls into, also based on the output of the text classifier. However, in another embodiment of the invention, an expected time criticality of each text, such as an email message, is determined. This can be written as $$EL = \sum_{i}^{n} p(critical_i)C(critical_i)$$

where EL is the expected loss, $p(critical_i)$ is the probability that a text has the criticality i (e.g., where i=0 may be low priority and i=1 may be high priority, or where i=0 may be low priority, i=1 medium priority and i=2 high priority, etc.), $C(critical_i)$ is the cost function for text having the criticality i, and n is the total number of criticality classes minus one. The cost functions may be linear or non-linear, as has been described—in the case where the function are linear, the cost function is thus the rate of loss.

In the case where n=1, specifying that there are only two priority classes low and high, the expected loss can be reformulated as $$EC = p(critical_{high})C(critical_{high}) + [1-p(critical_{low})]C(critical_{low})$$

where EC is the expected criticality of a text. Furthermore, if the cost function of low criticality messages is set to zero, this becomes $$EC = p(critical_{high})C(Critical_{high})$$

The total loss until the time of review of a text can be expressed as the integration of the expressed criticality, or, $$EL = \int_0^t p(critical_{high})C(critical_{high})$$

where t is the time of review.

Determining When to Alert the User

In this section of the detailed description, described is provided as to determining when to alert the user of a high-priority text, for example, a text that has a likelihood of being high priority greater than a user-set threshold, or greater than a threshold determined by decision theoretic reasoning. That is, beyond knowing about time critical messages, it is also important in one embodiment to decide when to alert a user to time critical messages if the user is not directly viewing incoming email (in one embodiment). In the general case, a cost of distracting the user from the current task being addressed to learn about the time-critical message is determined.

In general, a user should be alerted when a cost-benefit analysis suggests that the expected loss the user would incur in not reviewing the message at time t is greater than the expected cost of alerting the user. That is, alerting should be conducted if $$EL - EC > 0$$

where EL is the expected loss of non-review of the text at a current time t, and EC is the expected cost of alerting the user of the text at the current time t. The expected loss is as described in the previous section of the detailed description.

However, this formulation is not entirely accurate, because the user is assumed to review the message on his or her own at some point in the future anyway. Therefore, in actuality, the user should be alerted when the expected value of alerting, referred to as ECA, is positive. The expected value of alerting should thus consider the value of alerting the user of the text now, as opposed to the value of the user reviewing the message later on his or her own, without alert, minus the cost of alerting. This can be stated as $$EVA = EL_{alert} - EL_{no-alert} - EC$$

where $EL_{alert}$ is the expected loss of the user reviewing the message if he or she were to review the message now, upon being alerted, as opposed to $EL_{no-alert}$, which is the expected loss of the user reviewing the message on his or her own at some point, without being alerted, minus EC, the expected cost of alerting (now).

Furthermore, in one specific embodiment of the invention, information from several messages is grouped together into a single compound alert. Reviewing information about multiple messages in an alert can be more costly than an alert relaying information about a single message. Such increases in distraction can be represented by making the cost of an alert a function of its informational complexity. It is assumed that the EVA of an email message is independent of the EVA of the other email messages. $EVA(M_i,t)$ is used to refer to the value of alerting a user about a single message $M_i$ at time t and $EGA(n)$ is used to refer to the expected cost of relaying the content of n messages. Thus, multiple messages can be considered by summing together the expected value of relaying information about a set of n messages, $$NEVA = \sum_{i=1} EVA(M_i, t) - ECA(n).$$

In one embodiment of the invention, it is noted that determining when to alert the user is conducted in accordance with the more rigorous treatment of EVA described in the copending, cofiled and coassigned application entitled "A Computational Architecture for Managing the Transmittal and Rendering of Information, Alerts, and Notifications" filed on Jul. 30, 1999 and assigned Ser. No. 09/365,287, which is hereby incorporated by reference. However, the invention is not so limited.

It is also noted that in order to determine the expected cost of alerting, it is useful to infer or directly access information about whether the user is present—and therefore can see or hear alerts from the computer—or is not present. Sensors can be used in one embodiment that indicate when a user is in the office, such as infrared sensors, pressure sensors (on the chair), etc. However, if such devices are not available, a probability that a user is in the office can be assigned as a function of user activity on the computer, such as the time since last observed mouse or keyboard activity. Furthermore, scheduling information available in a calendar can also be made use of to make inferences about the distance and disposition of a user, to consider the costs of forwarding messages to the user by different means (e.g., cell phone, pager, etc.).

Figure 6:
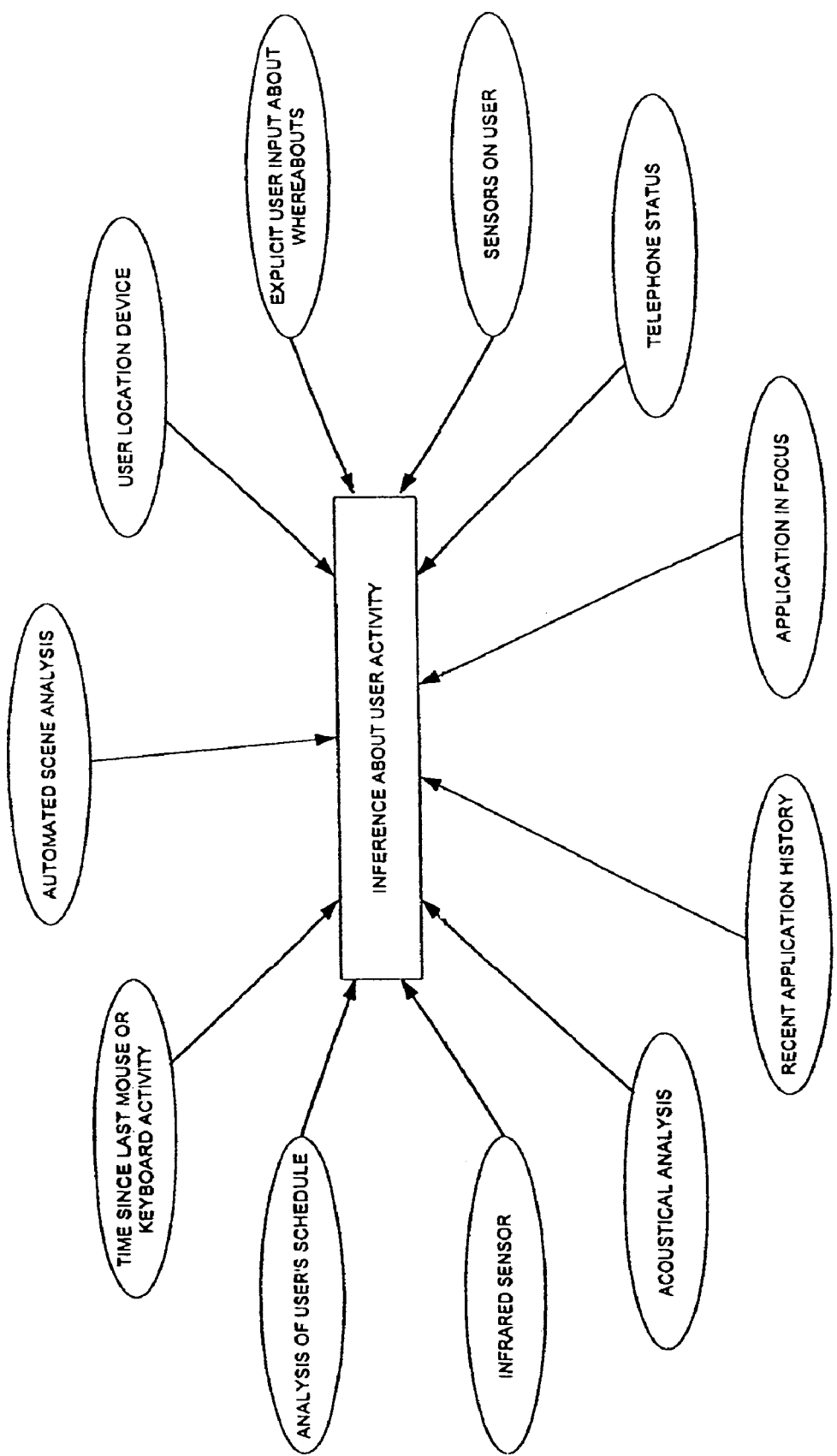
FIG. 6 is a diagram showing classes of evidence that can be used to make an inference about a user's activity (e.g., if a user is present), according to one embodiment of the invention.
Figure 7:
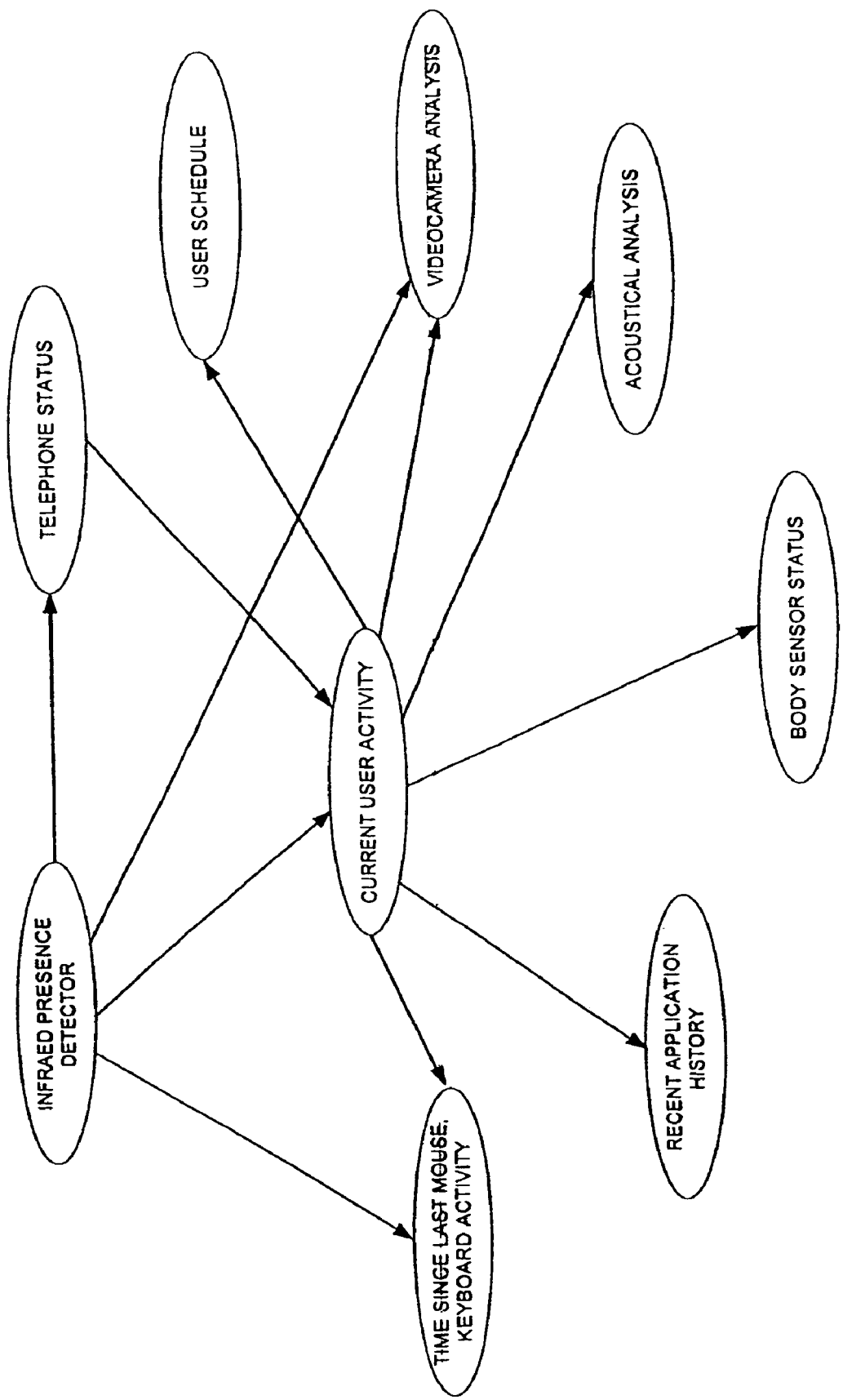
FIG. 7 is a diagram showing a Bayesian network that can be used for inferring a user's activity (e.g., if a user is present), according to one embodiment of the invention.

It is also important to know how busy the user is in making decisions about interrupting the user with information about messages with high time criticality. In one embodiment, it is reasoned about whether and the rate at which a user is working on a computer, or whether the user is on the telephone, speaking with someone, or at a meeting at another location. In one embodiment, several classes of evidence can be used to assess a user's activity or his or her focus of attention, as shown in FIG. 6. A Bayesian network, as known in the art, can then be used for performing an inference about a user's activity; an example of such a network is shown in FIG. 7. Utilizing evidence to infer whether the user is present is described more rigorously in the cofiled, copending and coassigned application entitled "A Computational Architecture for Managing the Transmittal and Rendering of Information, Alerts, and Notifications" filed on Jul. 30, 1999 and assigned Ser. No. 09/365,287, which has already been incorporated by reference (specifically, with respect to determining one or more probabilities). Thus, in one embodiment, a probability inference as to whether a user is present is determined in accordance with the description provided in this application.

In general, a decision should be made as to when and how to alert users to messages and to provide services (for example) based on the inference of expected criticality and user activity. In one embodiment, this decision is made as described in the cofiled, copending and coassigned application entitled "A Computational Architecture for Managing the Transmittal and Rendering of Information, Alerts, and Notifications" filed on Jul. 30, 1999 and assigned Ser. No. 09/365,287, which has already been incorporated by reference.

Figure 8:
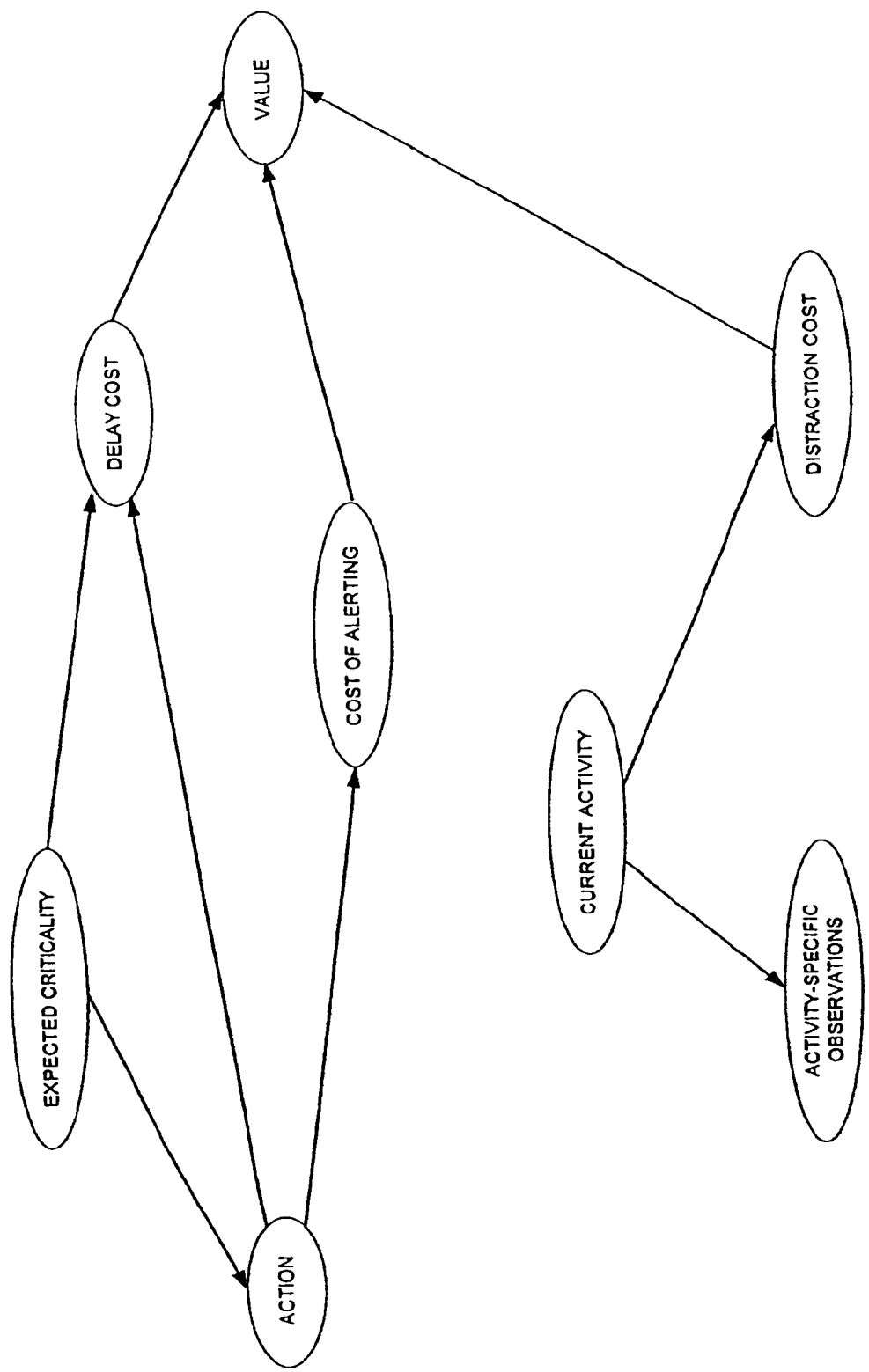
FIGS. 8-10 are influence diagrams showing how in one embodiment decision models can be utilized to make the decision as to how and when to alert a user to a message.
Figure 9:
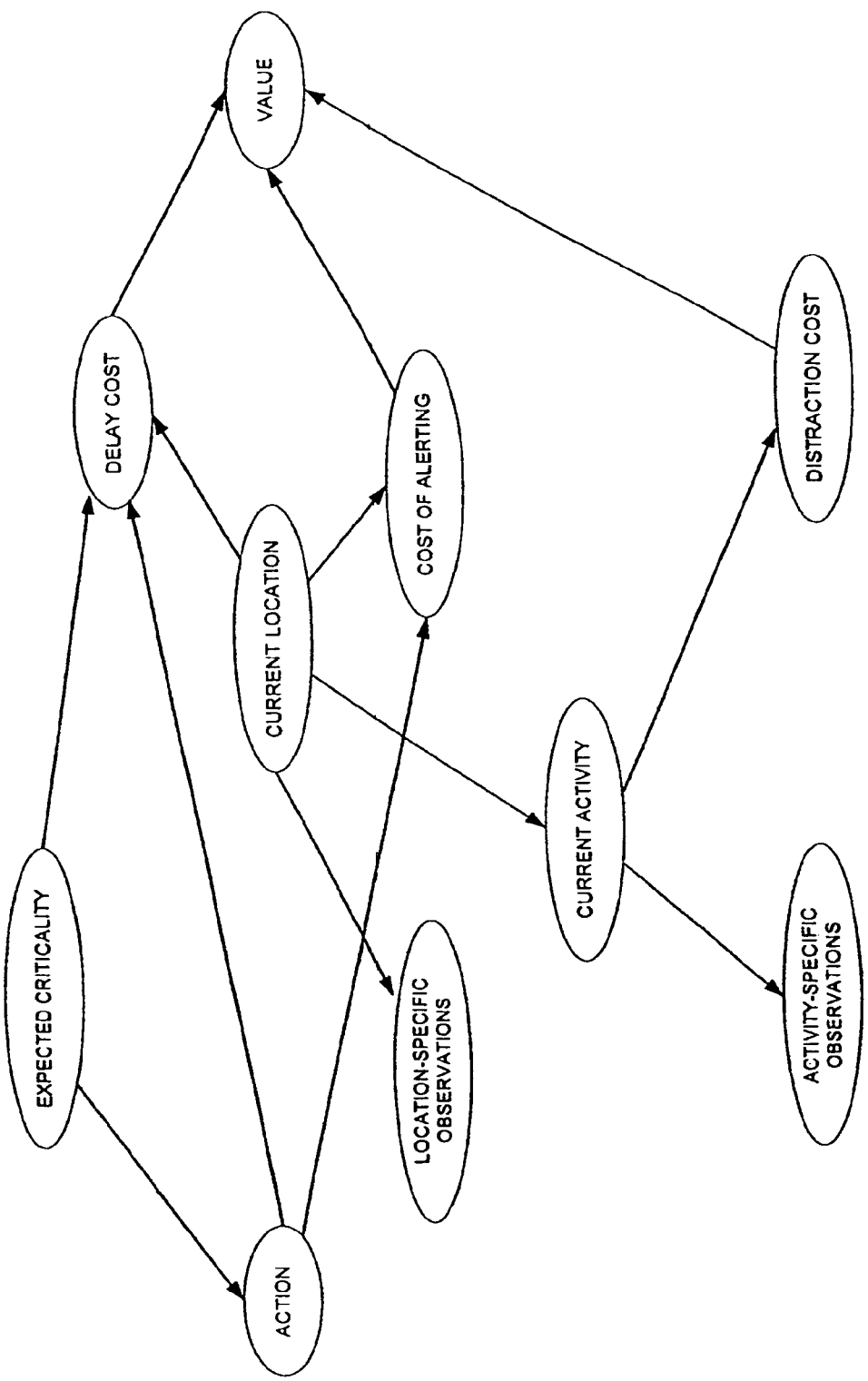
Figure 10:
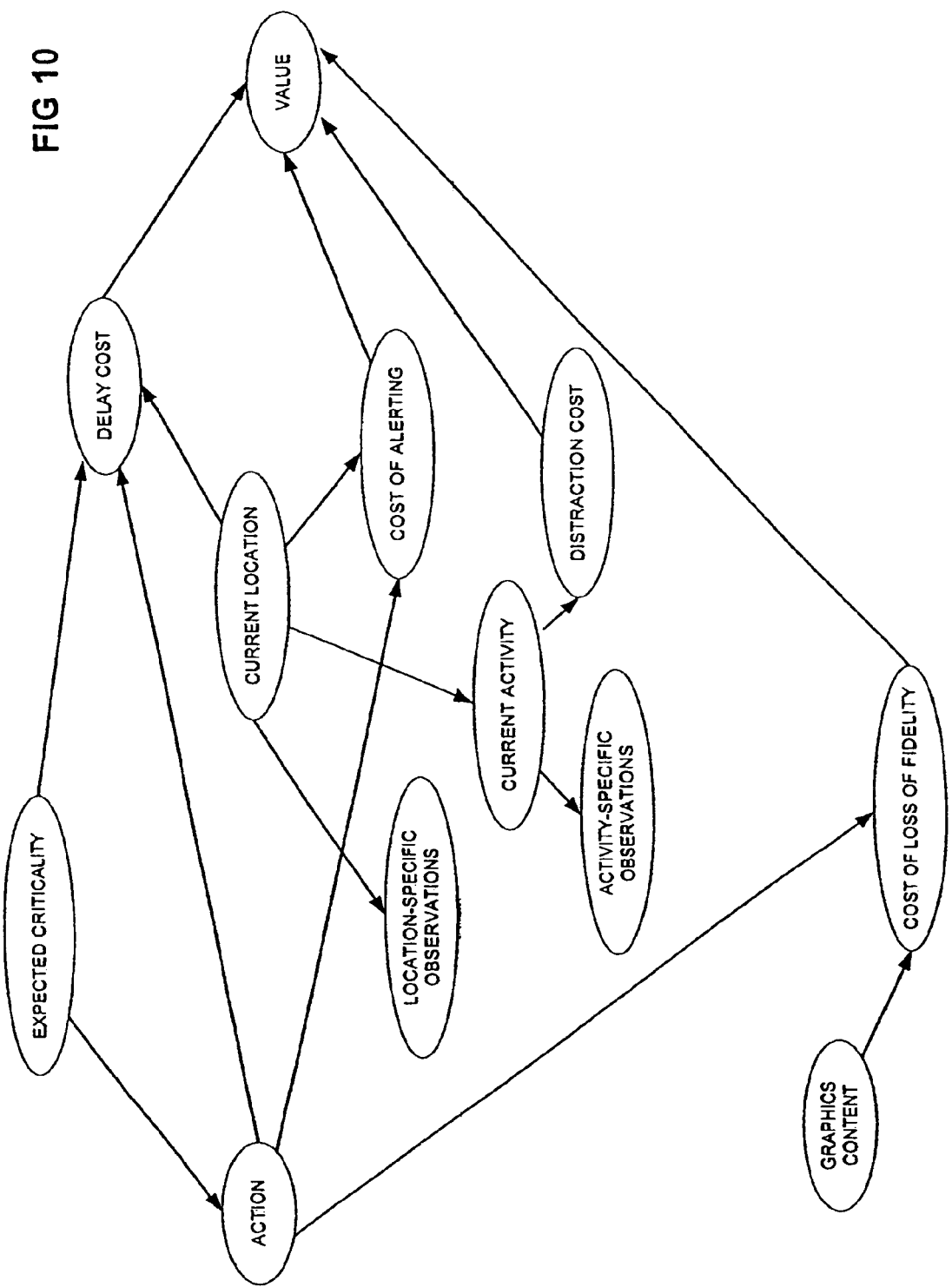

In another embodiment, this decision is made by utilizing decision models, as known within the art. FIGS. 8-10 are influence diagrams, as known within the art, showing how in one specific embodiment such decision models can be utilized to make this decision. Specifically, FIG. 8 displays a decision model for decisions about interrupting a user, considering current activity, expected time criticality of messages, and cost of alerting depending on the modality. FIG. 9 also includes variables representing the current location and the influence of that variable on activity and cost of the alternate messaging techniques. Finally, FIG. 10 is further expanded to consider the costs associated with losses in fidelity when a message with significant graphics content is forwarded to a user without the graphical content being present.

In still another embodiment, the decision as to when and how to alert users is made by employment of a set of user-specified thresholds and parameters defining policies on alerting. In this embodiment, user presence can be inferred based on mouse or keyboard activity. Thus, a user can be allowed to input distinct thresholds on alerting for inferred states of activity and nonactivity. Users can input an amount of idle activity following activity where alerting will occur at lower criticalities. In this embodiment, if it is determined that the user is not available based on the time that no computer activity is seen—or on the user's inactivity when an attempt to alert is made—then messages are stored, and are reported to the user in order of criticality when the user returns to interact with the computer (or, returns to the room, given the availability of inputs from infrared or other presence detection).

Furthermore, in this embodiment, users can specify routing and paging options (as well as other output options) as a function of quantities including expected criticality, maximum expected loss, and value of alerting the user. Such routing, paging and other output options are more specifically described in the copending, cofiled, and coassigned applications entitled "Integration of a Computer-Based Message Priority System with Mobile Electronic Devices" filed on Jul. 30, 1999 and assigned Ser. No. 09/365,293, and "Methods for Display, Notification, and Interaction with Prioritized Messages" filed on Jul. 30, 1999 and assigned Ser. No. 09/364,522, which are all hereby incorporated by reference. The invention is not so limited, however.

Method and System

In this section of the detailed description, a computer-implemented method according to an embodiment of the invention is described, and a computerized system according to an embodiment of the invention is described. With respect to the method, the method is desirably realized at least in part as one or more programs running on a computer—that is, as a program executed from a computer-readable medium such as a memory by a processor of a computer. The program is desirably storable on a machine-readable medium such as a floppy disk or a CD-ROM, for distribution and installation and execution on another computer.

Figure 11:
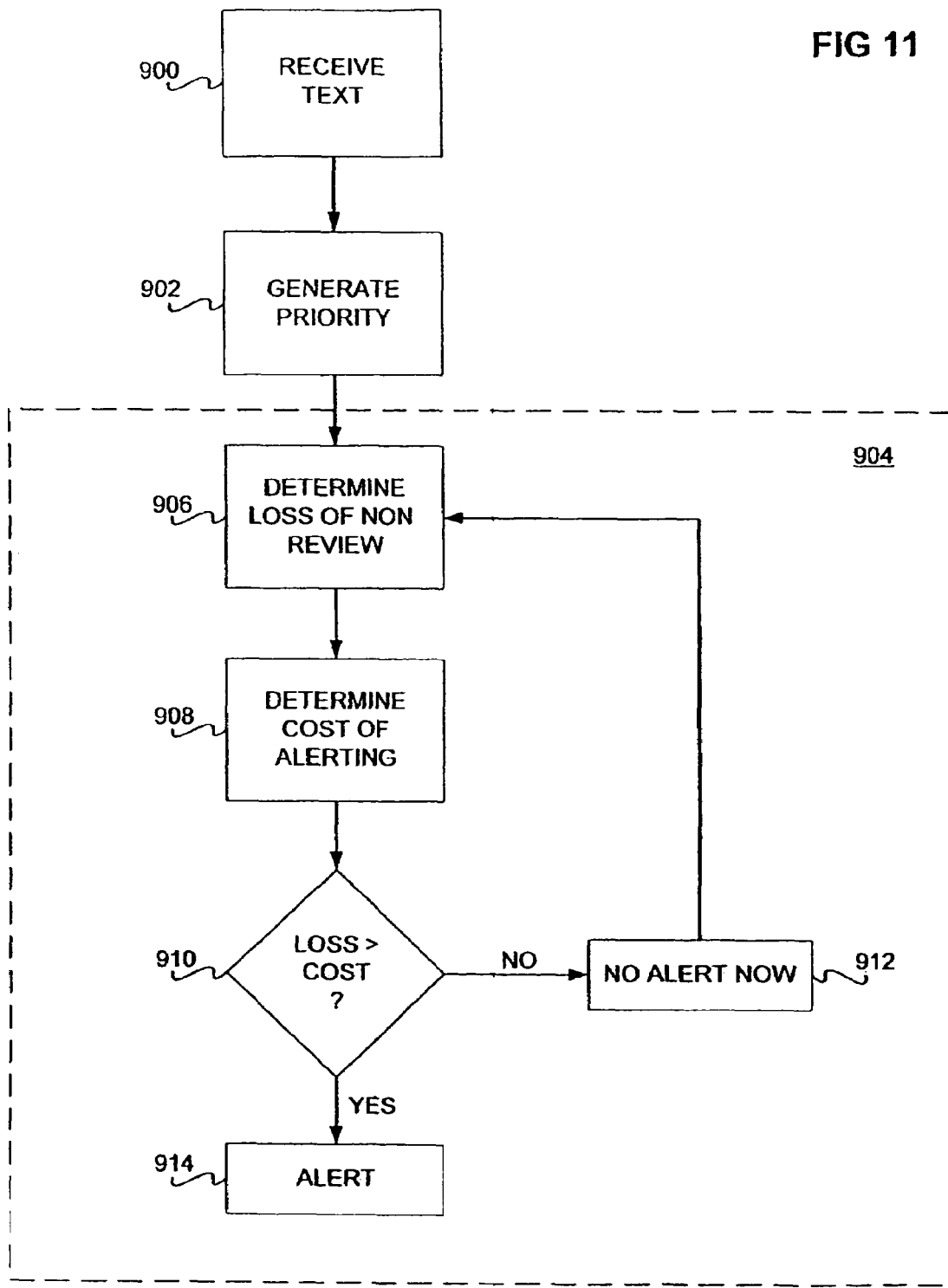
FIG. 11 is a flowchart of a method according to an embodiment of the invention.

Referring to FIG. 11, a flowchart of a method according to an embodiment of the invention is shown. In 900, a text to have a priority thereof assigned is received. The text can be an email message, or any other type of text; the invention is not so limited. In 902, the priority of the text is generated, based on a text classifier, as has been described. Thus, in one embodiment, 902 includes initially training and continually training the text classifier, as has been described.

The priority of the text is then output in 904. In one embodiment, as indicated in FIG. 11, this can include 906, 908, 910, 912 and 914; however, the invention is not so limited. In 906, an expected loss of non-review of the text at a current time t is determined—in one embodiment, by also considering the expected loss of non-review of the text at a future time, based on the assumption that ultimately the user will review the text him or herself, without being alerted, as has been described. In 908, an expected cost of alerting is determined, as has also been described. If the loss is greater than the cost in 910, then no alert is made at the time t, and the method proceeds back to 906, to redetermine the cost-benefit analysis, at a new current time t. This is done because as time progresses, the expected loss may at some point outweigh the alert cost, such that the calculus in 910 changes. Upon the expected loss outweighing the alert cost, then an alert to the user is performed in 914, as has been described.

In one embodiment, the output of the alert is performed as is now described. The alert is performed by routing the prioritized text based on a routing criteria. Routing criteria that can be used in conjunction with embodiments of the invention is not limited by the invention; however, in one embodiment, the routing criteria is as described in a further section of the detailed description. Routing of the text can include forwarding the text, or replying to the sender of the text, in the case where the text is email.

Figure 12:
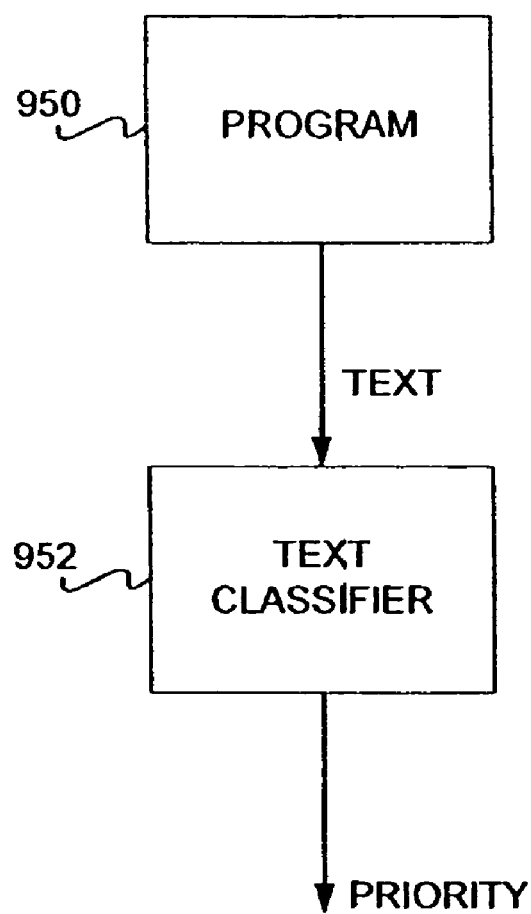
FIG. 12 is a diagram of a system according to an embodiment of the invention.

Referring next to FIG. 12, a diagram of a system according to an embodiment of the invention is shown. The system includes a program 950 and a text classifier 952. Each of the program 950 and the classifier 952 include a computer program executed by a processor of a computer from a computer-readable medium thereof, in one embodiment. However, the invention is not so limited.

The program 950 generates a text for input into the text classifier 952. In one embodiment, the program includes an electronic mail program that receives email, which then serve as the text. The text classifier 952, based on the text, generates a priority thereof, as has been described. In one embodiment, the text classifier 952 is a Bayesian text classifier, while in another embodiment, it is a Support Vector Machine classifier. The priority of the text output by the text classifier 952 can then be used in further conjunction with a cost-benefit analysis, as has been described, to effectuate further output and/or alerting based thereon, as has been described. The invention is not so limited, however.

Figure 13:
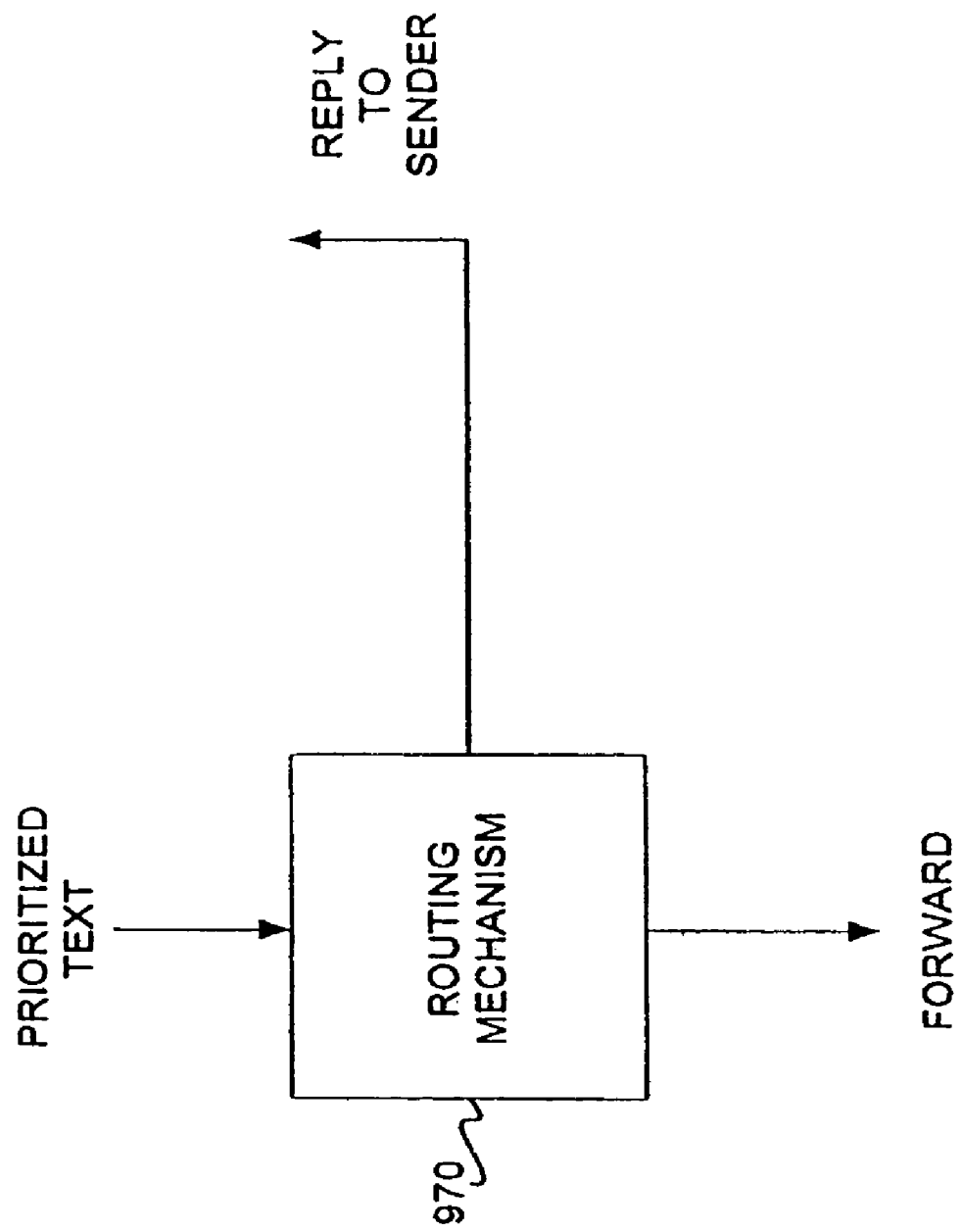
FIG. 13 is a diagram of a system according to another embodiment of the invention; and, FIGS. 14(a) and 14(b) are diagrams of a user interface via which routing criteria can be modified, according to an embodiment of the invention.

Referring next to FIG. 13, a diagram of a system according to another embodiment of the invention is shown. The system of FIG. 13 includes an additional component, a routing mechanism 970. Not shown in FIG. 13 are the program 950 and the text classifier 952; however, the routing mechanism 970 is operatively and/or communicatively coupled to the latter. In one embodiment, the mechanism 970 includes a computer program executed by a processor of a computer from a computer-readable medium thereof, but the invention is not so limited.

The routing mechanism 970, as shown in FIG. 13, receives a prioritized text, and based on a routing criteria, is able to reply to the sender of the text (in the case where the text is an email message), in which case the mechanism is a replying mechanism. Also based on the routing criteria, the mechanism 970 is able to forward the text, for example, to a different email address, in which case the mechanism is a forwarding mechanism. The former may be useful when the user wishes to indicate to the sender of a message that the user is not present, and thus may provide the sender with contact information as to how to reach the user. The latter may be useful when the user has email access to a different email address, such as a web-based email address as known in the art (examples include Microsoft Corp.'s HotMail at http://www.hotmail.com), such that the user wishes to be kept informed of high priority emails at this alternative address. The invention is not limited as to a particular routing criteria, although in one embodiment, the routing criteria is as described in the next section of the detailed description.

Routing Criteria

In this section of the detailed description, a routing criteria according to one embodiment of the invention is described. The routing criteria is the criteria that governs when and how a user is alerted to a prioritized text by having the text routed—for example, forwarded to another email address, or such that the sender of the original text is replied to. The routing criteria is described with reference to FIGS. 14(a) and 14(b), which are diagrams of a user interface via which routing criteria options can be modified, according to one embodiment of the invention.

Referring first to FIG. 14(a), two tabs are selectable, a forward tab 990 and a custom reply tab 992. In FIG. 14(a), however, the forward tab 990 is specifically selected, such that routing criteria with respect to forwarding a prioritized text such as an email message are shown. The user is able to specify an alternative email address to which high-priority emails are forwarded. More specifically, emails are forwarded to the address if the user has been away from the computer more than a predetermined amount of time, and a particular email to be forwarded has a priority greater than a predetermined threshold. For example, as shown in FIG. 14(a), the predetermined threshold is a priority of 95, and the predetermined amount of time is 600 minutes. Thus, if it is determined that the priority of an email message is greater than 95, and that the user has been away from the computer for more than 600 minutes, then the email will be forwarded to the specified email address.

Referring next to FIG. 14(b), the same two selectable tabs are shown, the forward tab 990 and the custom reply tab 992. However, in FIG. 14(b), the custom reply tab 992 is specifically selected, such that routing criteria with respect to replying to the sender of a prioritized text such as an email message are shown. The user is able to specify a predetermined message that will be sent in the reply to the sender of the high-priority email message. Emails are replied to if the user has been away from the computer more than a predetermined amount of time, and a particular email to be replied to has a priority greater than a predetermined threshold. For example, as shown in FIG. 14(b), the predetermined threshold is a priority of 95, and the predetermined amount of time is 120 minutes. Thus, if it is determined that the priority of an email message is greater than 95, and that the user has been away from the computer for more than 120 minutes, then the sender of the email will be replied to with the specified predetermined message.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

The invention claimed is:

1. A computer-implemented method that facilitates communicating, comprising:
   generating a priority of a received communication item based on a trained classifier, the priority is related to a net expected value of alerting (NEVA), where NEVA=EVTA−ECA−TC, and EVTA is an expected value of alerting, ECA is an expected cost of alerting, and TC is a transmission cost;
   determining whether a user has been away from a computer for more than a predetermined amount of time; and
   automatically routing the communication item based on a routing criteria and the priority upon determining that the user has been away from the computer for more than the predetermined amount of time.

2. The method of claim 1, the priority relates to an urgency of the communication item relative to an intended recipient.

3. The method of claim 1, the priority is a measure of a rate of cost accrued with delayed review of the item.

4. The method of claim 1, further comprising inferring the user's presence based on at least one of mouse or keyboard activity.

5. The method of claim 1, the item comprises at least one of an email, a text, a document, a file, a message, a message attachment, and content associated with the message.

6. The method of claim 1, the routing comprises forwarding the item.

7. The method of claim 1, the routing comprises replying to a sender of the item.

8. The method of claim 7, replying to the sender comprises replying with a predetermined message.

9. The method of claim 1, further comprising determining whether the priority exceeds a predetermined threshold and routing the item when the priority exceeds the threshold.

10. The method of claim 1, further comprising determining a user's presence, and routing the item if the user is absent and the priority of the item exceeds a predetermined threshold.

11. The method of claim 1, further comprising identifying whether a user is preoccupied, and routing the item based in part upon the identified preoccupation.

12. The method of claim 1, the routing criteria governs when and how a user is alerted to a prioritized item.

13. A computerized system that facilitates communicating, comprising:
   means for generating a priority of a received communication item based on a trained classifier, the priority is related to a net expected value of alerting (NEVA), where NEVA=EVTA−ECA−TC, and EVTA is an expected value of alerting, ECA is an expected cost of alerting, and TC is a transmission cost;
   means for determining whether the priority exceeds a predetermined threshold; and
   means for automatically routing the communication item based on a routing criteria upon determining that the priority exceeds the threshold.

14. A computer-implemented system that facilitates communicating, comprising:
   a classifier component that generates a priority of a received communication item based on a trained classifier, the priority is related to a net expected value of alerting (NEVA) where NEVA=EVTA−ECA−TC, and EVTA is an expected value of alerting, ECA is an expected cost of alerting and TC is a transmission cost; and
   a routing component that determines a user's presence at a computer and automatically routes the communication item based on a routing criteria and the priority when it is determined that the user is not present the computer.

15. The system of claim 14, the priority relates to an urgency of the communication item relative to an intended recipient.

16. The system of claim 14, the priority is a measure of a rate of cost accrued with delayed review of the item.

17. The system of claim 14, the routing component determines whether the priority exceeds a predetermined threshold and routes the item when the priority exceeds the threshold.

18. The system of claim 14, the communication item comprises at least one of an email, a text, a document, a file, a message, a message attachment, and content associated with the message.

19. The system of claim 14, the routing component forwards the item.

20. The system of claim 14, the routing component replies to a sender of the item.

* * * * *